United States Patent [19]

Guenther

[11] Patent Number: 5,027,871

[45] Date of Patent: Jul. 2, 1991

[54] LPG TANK CONTROL VALVE SYSTEM

[76] Inventor: Mathias J. J. Guenther, 1169 Prairie Avenue, Port Coquitlam, BC, Canada, V3B 157

[21] Appl. No.: 484,883

[22] Filed: Feb. 23, 1990

[51] Int. Cl.[5] ........................ F16K 17/36; F16K 31/18

[52] U.S. Cl. ........................................ 141/198; 141/18; 141/83; 141/94; 141/95; 141/212; 141/213; 141/215; 141/216; 137/441; 137/434; 137/446; 251/129.15; 220/85.00 F; 220/85.00 S

[58] Field of Search ............... 137/389, 390, 391, 400, 137/409, 434, 441, 446, 587, 590; 141/1, 4, 10, 83, 94, 95, 192, 198, 210, 211, 212, 213, 214, 215, 216; 251/129.15; 220/85 F, 85 S

[56] References Cited

U.S. PATENT DOCUMENTS

| | | | |
|---|---|---|---|
| 2,767,551 | 10/1956 | Clute | 141/212 X |
| 2,767,552 | 10/1956 | Clute | 137/390 X |
| 3,509,998 | 5/1970 | Pellett et al. | 137/446 |
| 3,701,363 | 10/1972 | Schuler et al. | 141/18 X |
| 3,929,155 | 12/1975 | Garretson | 141/198 X |
| 4,064,907 | 12/1977 | Billington et al. | 137/446 X |
| 4,142,552 | 3/1979 | Brown et al. | 137/446 |
| 4,191,208 | 3/1980 | Mylander | 141/198 X |
| 4,305,422 | 12/1981 | Bannink | 141/198 X |
| 4,313,459 | 2/1982 | Mylander | 141/198 X |
| 4,360,038 | 11/1982 | Trinkwalder Jr. | 137/390 |
| 4,462,417 | 7/1984 | Trinkwalder Jr. | 137/390 X |
| 4,483,367 | 11/1984 | Ross Jr. et al. | 137/446 X |
| 4,541,464 | 9/1985 | Christiansen | 141/198 |
| 4,681,142 | 7/1987 | Woeller et al. | 137/614.18 |

FOREIGN PATENT DOCUMENTS

| | | | |
|---|---|---|---|
| 912431 | 10/1972 | Canada . | |
| 982445 | 1/1976 | Canada . | |
| 1087067 | 10/1980 | Canada . | |
| 605477 | 6/1960 | Italy | 137/446 |
| 565 | 2/1874 | United Kingdom | 137/446 |
| 1652 | 1/1902 | United Kingdom | 137/446 |
| 201962 | 12/1923 | United Kingdom | 137/437 |
| 247754 | 2/1926 | United Kingdom | 137/434 |
| 10894 | 7/1988 | United Kingdom | 137/446 |

*Primary Examiner*—Ernest G. Cusick
*Attorney, Agent, or Firm*—Berman, Aisenberg & Platt

[57] ABSTRACT

A multi-functional control valve system for an LPG tank. The valve system comprises, on a single frame, a fill port for delivery of LPG from a supply source to the tank, a manual shut-off valve for the fill port, a delivery port, independent from the fill port, for passage LPG from the tank to a delivery line for utilization at a location remote from the tank, a manual shut-off valve for the delivery port, fuel level monitor associated with a frame responsive to the level of LPG in the tank and an automatic shut-off associated with the fuel level monitor and positioned in the fill port automatically to move to close the fill port and stop delivery of LPG to the tank when the fuel in the tank reaches a predetermiend level, and automatically releasable from that closed position when LPG in the tank falls below that level, as indicated by the monitor. This valve system provided in one compact frame, which may be readily fitted or retro-fitted to a tank, many desirable features for safe and convenient LPG tank operation.

24 Claims, 5 Drawing Sheets

LPG TANK CONTROL VALVE SYSTEM

BACKGROUND OF THE INvENTION

The present invention relates to a multi-functional control valve system for a liquid petroleum gas (LPG) tank.

With the increased modern day emphasis on LPG such as propane for fuels, there has been a need for increased safety and convenience in the handling of LPG both commercially and domestically. Thus, for example, new cars are being manufactured and old cars are being adapted, to run on LPG. LPG systems require the fuel to remain in liquid state until the fuel is actually about to be converted to energy through combustion. This requires the fuel tank and delivery lines to be maintained under relatively high pressure. This means that, cars, conventional gasoline storage and delivery systems, including holding tanks, delivery lines, fuel gauges, filling ports and the like, cannot be used for LPG. Also, when LPG tanks are filled, again because of the pressure conditions under which the fuel must be maintained, problems of overfilling of the fuel tank and spillage of fuel leading to hazardous conditions during the filling process, become significant. Again, because of the pressures involved, leakage around inlet and outlet valves of conventional LPG fuel storage tanks creates a serious problem.

Conventional LPG storage and delivery systems for example used on cars, trucks, forklifts and the like until now have required multiple ports, for example for filling, for fuel delivery to the combustion area, for bleeding to warn of overfilling, and for pressure relief. At each of these ports, control problems such as leakage of gas, may potentially arise.

Prior references of general background interest with respect to the present invention include Canadian Patent No. 912,431 issued Oct. 17, 1972 of Tappin, which describes and illustrates safety cut-off equipment for burners designed for bottled propane and similar LPG fuels; Canadian Patent No. 982,445 of Nelson issued Jan. 27, 1976 which describes and illustrates a shut-off valve assembly, albeit for gasoline supply lines at gasoline filing stations, and Canadian Patent No. 1,087,067 of Hughes issued Oct. 7, 1980 relating to a relay pilot regulator having combined loading and unloading valves which share a common operating linkage.

It is an object of the present invention to provide a control valve system for an LPG tank which is unique in construction and which overcomes many of these problems previously encountered with control valve systems for LPG tanks.

SUMMARY OF THE INvENTION

In accordance with the present invention, there is provided a multi-functional control valve system for an LPG tank. The system comprises a frame which has an upper and lower surface and a flange about the lower surface to fasten the frame over an opening in the tank. A fill port in the frame delivers LPG from a supply source to the tank. The fill port extends through the frame from the upper surface to the lower surface. A manual shut-off valve is associated with the fill port to close off the fill port and prevent passage of LPG through this port. A delivery port is also provided in the frame, independent from the fill port, for passage of LPG from the tank to a delivery line for utilization at a location remote from the tank (e.g. a car engine). A manual shut-off valve is associated with the delivery port to close off the delivery port and prevent passage of LPG through this port. A fuel level monitor means is associated with the frame, responsive to the level of LPG in the tank when the frame is in operative position with respect to the tank. An automatic shut-off valve is operatively associated with the fuel level monitor means and is positioned in the fill port. The automatic shut-off valve automatically moves to closed position to close the fill port and stop delivery of LPG to the tank when the fuel in the tank reaches a predetermined level, and automatically releases from closed position when delivery pressure of LPG in the fill port is removed, i.e. when the filling action is stopped.

In a preferred embodiment, the valve system further comprises a solenoid operated automatic shut-off valve positioned in the delivery port to automatically close the delivery port when utilization of LPG at the remote location is not required. As well, an excess flow valve is positioned in the delivery port and calibrated to move to closed position to close off completely the flow of LPG through the delivery port when the flow rate exceeds a predetermined value. A manually operable means is associated with the excess flow valve to move the excess flow valve, when closed, away from closed position and permit resumption of flow of LPG through the delivery port.

As well, it is preferred that the automatic shut-off valve means associated with the fuel level monitor means comprises a filler valve seat positioned in the fill port and a filler valve mounted for movement within the fill port between open position and closed position in sealing engagement with the valve seat. A spool is rotatably secured to the frame and extends below its lower surface. A float is associated with the spool to float on LPG in the tank. The float causes rotation of the spool about an axis, the amount of rotation is proportional to the level of liquid in the tank. A shoulder extends outwardly from and circumscribes the spool. A gap in the shoulder at a predetermined location corresponds to a desired level to which the tank is to be filled and cooperates with the valve. A pin extends between the valve and the fuel level monitor means, with biasing means urging the pin and valve into open position. The pin rests on the shoulder to maintain the valve in open position during the filling operation, against the pressure of LPG flowing in the fill port. The gap in the shoulder becomes aligned with the valve pin when the tank is filled to the desired level. The pin is then forced down into the gap and valve into closed position on the seat, against the urging of the biasing means, by the pressure of the LPG being delivered to the tank acting against the valve during the filling operation. The fill port is further provided with a check valve seat spaced from the filler valve seat upstream thereof. The filler valve and biasing means are arranged so that, when the pressure of the LPG being delivered to the tank is removed from the filler valve, the biasing means urges the filler valve into closed position in sealing engagement on the check valve seat.

Other features and embodiments of the present invention will be described in more detail hereinafter.

It will be understood that the valve system according to the present invention provides, in one compact frame, which may be readily fitted or retro-fitted to a tank, many desirable features for safe and convenient LPG tank operation. The device provides for increased safety, for example, by individual shut-offs for both the fill and delivery ports and a reliable stop/fill at any desirable fill level.

Because the valve system according to the present invention requires only one flanging hub instead of multiple ports through different frames, common with present systems, the device according to the present invention provides significantly lower manufacturing and quality control costs. As well, assembly costs are lower since only a single flange instead of multiple elements common with present systems, must be connected to the tank.

The valve system according to the present invention, with the automatic shut-off valve means provides, for an LPG system, a reliable internal system which cannot be defeated to prevent overfilling, when filling a vehicle equipped with this device. As well, there will be little or no spillage of fuel during the filling process, as this automatic shut-off valve means removes the need for a conventional bleed valve, which spills propane gas during each filling cycle.

BRIEF DESCRIPTION OF THE DRAWINGS

These and other objects and advantages of the invention will become apparent upon reading the following detailed description and upon referring to the drawings in which.

Figure 1:
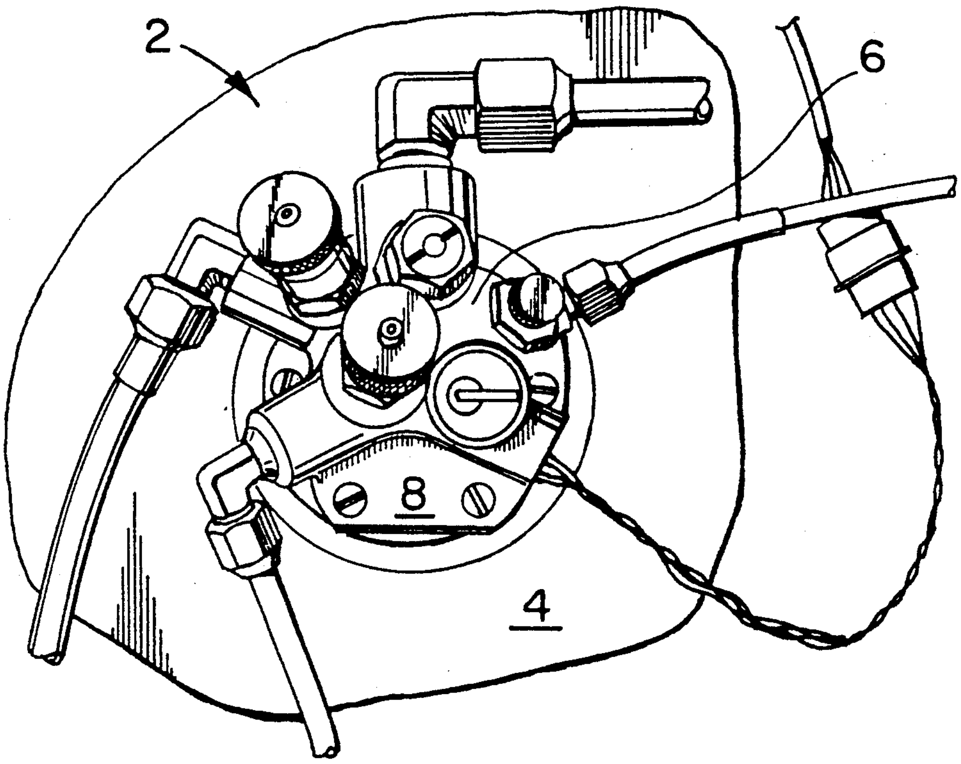
FIG. 1 is a perspective view of a control valve system in accordance with the present invention mounted on a vehicle LPG tank.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Figure 2:
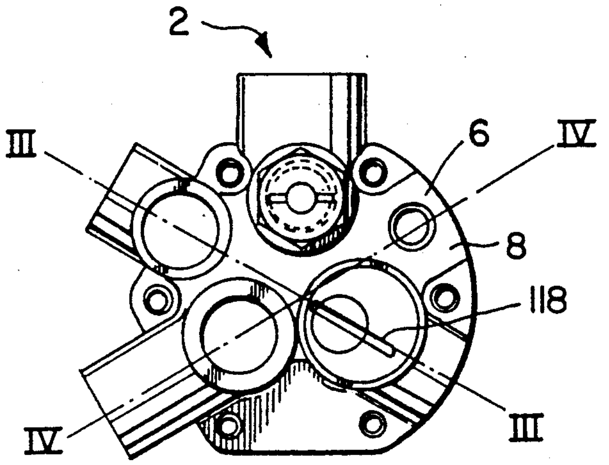
FIG. 2 is a plan view of the control valve system of FIG. 1.

Turning to the drawings, there is illustrated in FIGURES 1 and 2 a multi-functional control valve system 2 for an LPG tank 4. The valve system 2 comprises a frame 6 having an upper surface 8 and lower surface 10 (seen for example in FIG. 3), the lower surface 10 being circumscribed by an appropriate mounting flange 11 by which the frame 6 may be appropriately fastened (e.g. bolted) over an opening 14 in LPG tank 4. As can be seen for example in FIGS. 3 and 4, an appropriate sealing means, such as O-ring 16, is fitted in a groove 17 in lower surface 10, so as to circumscribe an opening (not illustrated) and ensure no leakage of fuel from under frame 6, when frame 6 is mounted on LPG tank 4.

Figure 3:
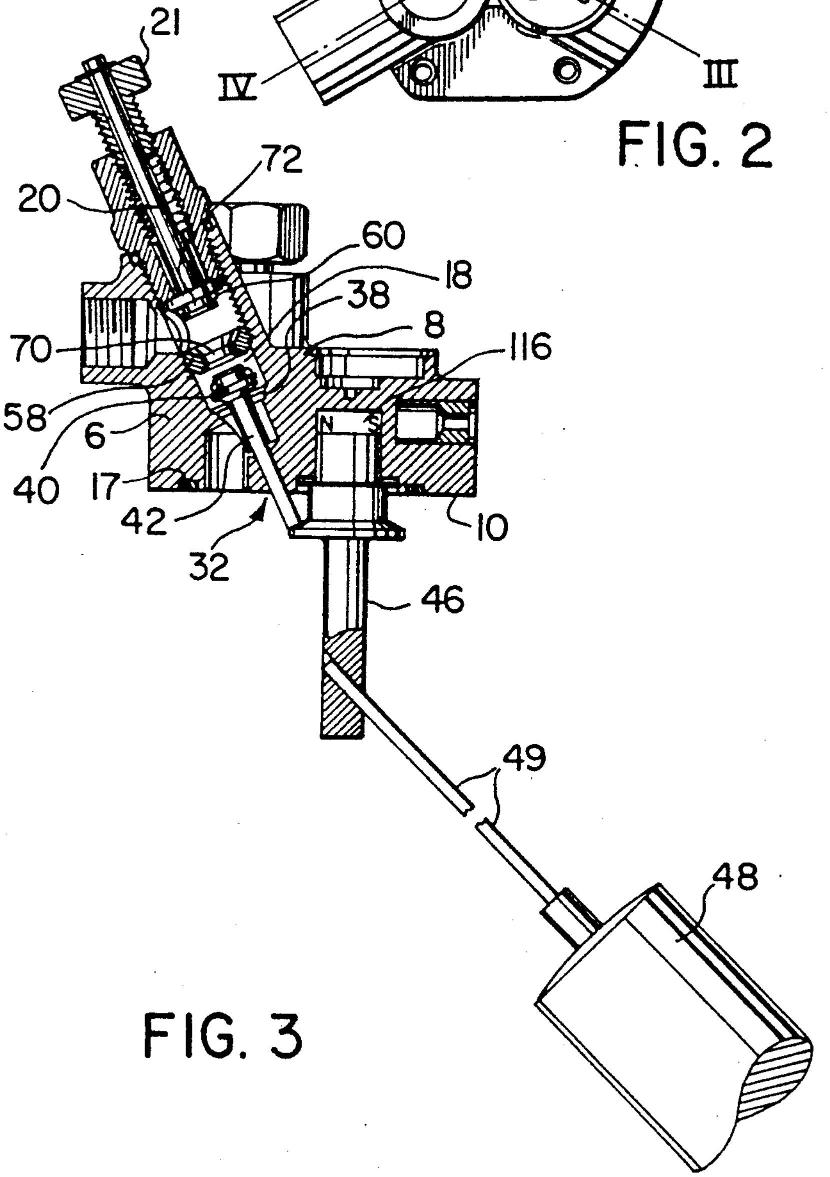
FIG. 3 is a section view through line III—III of FIG. 2, illustrating the fill port and fill control features of the present invention.

Turning to FIG. 3, a fill port 18 is provided in frame 6 to deliver LPG from a supply source, for example at a filling station, to tank 4 through frame 6, fill port 18 communicating between upper surface 8 and lower surface 10. A manual shut-off valve 20 is provided as illustrated, the turning of handle 21 causing the body of valve 20 to move into or out of blocking position in fill port 18, where it prevents passage of LPG through this port.

Figure 4:
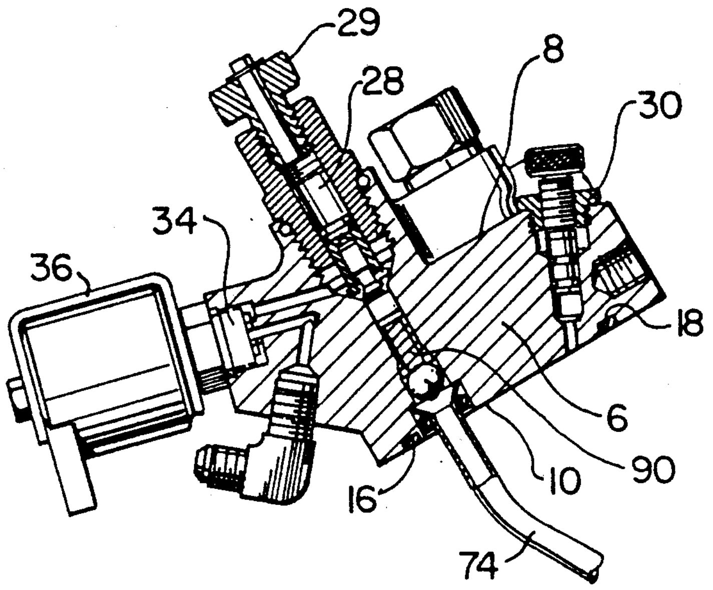
FIG. 4 is a section view along line IV—IV of FIG. 2, illustrating the delivery port and fuel delivery control features of the present invention.

FIG. 4 illustrates in section view the delivery port 22, through which LPG from tank 4 passes on its way to delivery line 24 to be utilized at a location remote from the tank. Again a manual shut-off valve 28 is associated with delivery port 22, the turning of handle 29 causing the body of valve 28 to either close off the port 22 and prevent passage of LPG through it, or, when turned in the opposite direction, to move out of the port and open it for passage of LPG through it.

Figure 5:
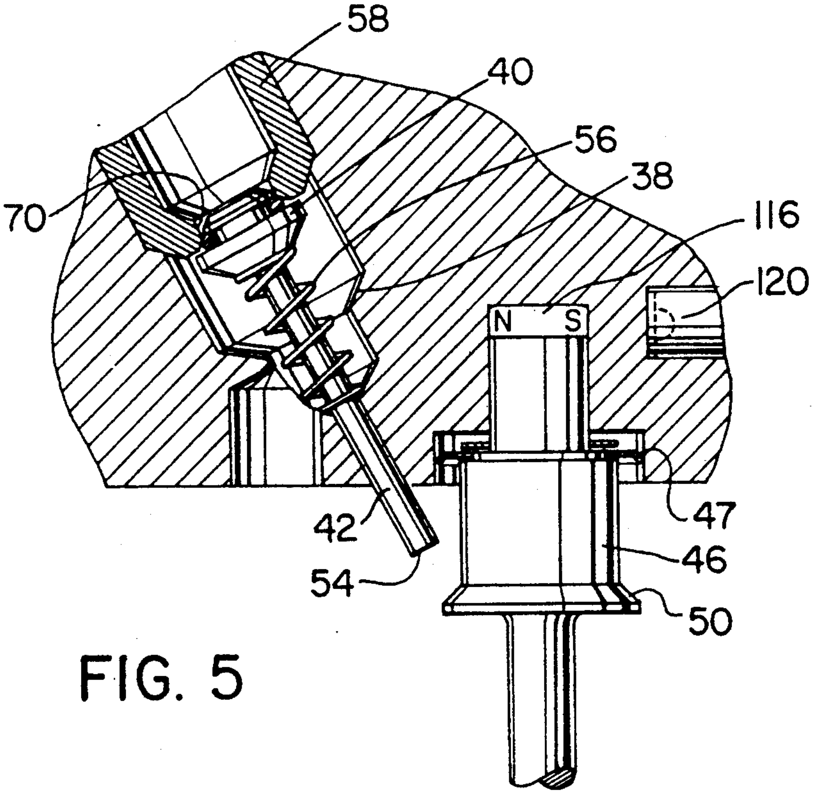
FIG. 5 is an enlarged schematic view in partial section, of the fill port auto shut-off feature and fill port check valve, as seen in FIG. 3.

As can be seen in FIGS. 3 and 5, a fuel level monitor means 30 is associated with frame 6, the function of which monitor means is to be responsive to the level of LPG in tank 4 when the frame is secured on tank 4.

An automatic shut-off valve means 32 (FIGS. 3 and 5) is provided for fill port 18 and associated with fuel level monitor means 30. As well, a shut-off valve means 34, activated by solenoid 36 (FIG. 4) is provided for delivery port 22.

Turning to the various features controlling the function of fill port 18, as particularly illustrated in FIGS. 3 and 5, a filler valve seat 38 is positioned in the filler port, as illustrated, and a filler valve 40 is mounted for movement within the fill port between open position (as illustrated in chain line), and closed position (as illustrated in full line), in sealing engagement with valve seat 38. A pin 42 is secured to the lower end of valve 40, and extends through frame 6 as illustrated. Fuel level monitor means 30 comprises a spool 46 which is rotatably secured to frame 6 by means of retaining clips 47, to extend below lower surface 10. A float 48 is attached to the lower portion of spool 46 by means of member 49, the spool being rotated by the float 48 as it responds to the level of LPG in tank 4. A shoulder 50 circumscribes spool 46 at an upper portion thereof, with a cut-out or gap 52 to receive the lower end 54 of pin 42. A spring 56, mounted on pin 42 and extending from the lower end of valve 40 to a wall of fill port 18 as indicated, normally urges valve 40 upwardly away from closed position on valve seat 38. The bias of spring 56 however is not great enough to overcome the pressure of LPG bearing against the upper end of valve 40, during the filling process. When gap 52 is aligned with pin 42, valve 40 will be depressed into sealing engagement with valve seat 38.

Thus valve 40, pin 42 and spool 46 provide, in conjunction with valve seat 38, a feature which will automatically stop the filling of tank 4 depending upon how spool 46, float 48 and gap 52 in shoulder 50 are arranged. In operation, at the start of a fill, pin 42 rides on the shoulder of spool 46, preventing valve 40 from being depressed by the pressure of LPG acting against the upper surface of valve 40. In this manner, port 18 is kept open so that gas may continue to be filled into tank 4. As the tank fills, float 48 rides on the surface of the LPG and rotates spool 46. As the maximum fill level for which spool 46 has been calibrated is reached, gap 52 becomes aligned with pin 42, so that the lower end 54 of the pin drops into the gap 52, thereby causing valve 40 to become sealingly engaged with valve seat 38. Repeated attempts to overfill will only result in valve 40 closing the fill port 18.

As the LPG level drops in tank 4 through consumption, and spring 56 has returned valve 40 to initial position, pin 42 and valve 40 are reset, so that fill port 18 is open, ready to accept the next fill.

Valve 40 and pin 42 also double as a check valve. To that end, valve seat 58 is mounted in port 18 above valve 40, and the upper end of valve 40 is conformed as a valve as illustrated, to sealingly engage with valve seat 58 under urging of spring 56 when the filling operation has stopped and seal port 18 against escape of fuel or fumes from tank 4 until manual shut-off valve 20 has been moved into closed position in fill port 18.

Figure 10:
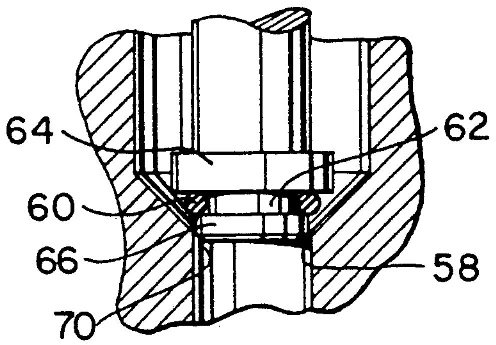
FIG. 10 is an enlarged schematic detail view in partial section of a preferred embodiment of shut-off valve for the system in accordance with the present invention.

Another innovative feature of the present invention lies in the design of the manual shut-off valve 20 which cooperates with valve seat 58, to form a "soft seat" valve (shown schematically in FIG. 10), which enables the use of an O-ring 60 as a sealing medium, which can be made to seal quite effectively as compared to other's configurations or materials, which have conventionally been used for shut-off valves in LPG systems and which may exhibit minor leakage. This portion of valve 20 has O-ring 60 seated in a groove 62 extending between a wide, stem flange 64 and a narrower, forwardly positioned stem nose 66, the forward portion of which is bevelled at 68 about its perimeter. The width of stem nose 66 is such as to engage the port 70 of valve seat 58 in a snug fitting, slide fit, as valve 20 is moved towards sealing engagement with valve seat 58. This reduces flow to a minimum, which protects O-ring 60 from excessive flow which could lead to its damage. Stem flange 64 and O-ring 60 then contact valve seat 58 at the same time, completing the closing off of port 70.

Figure 8:
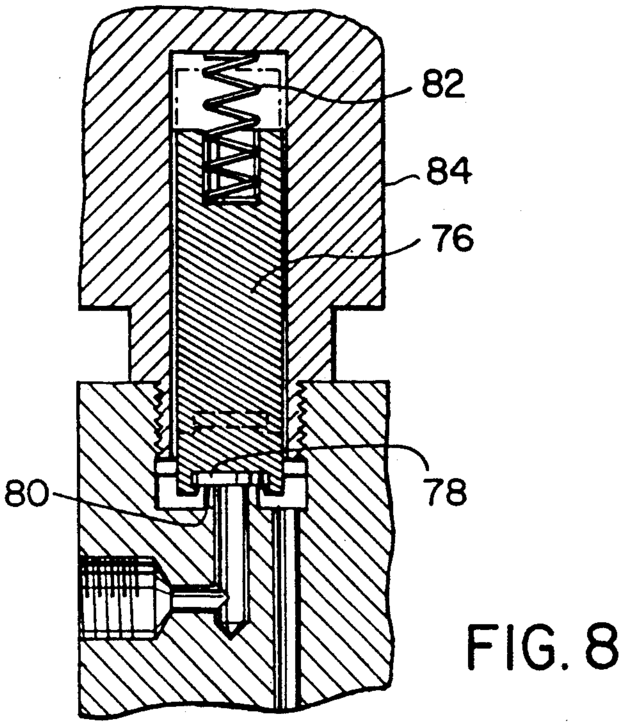
FIG. 8 is an enlarged schematic section view illustrating the operation of the delivery port solenoid shut-off of FIG. 4.
Figure 9:
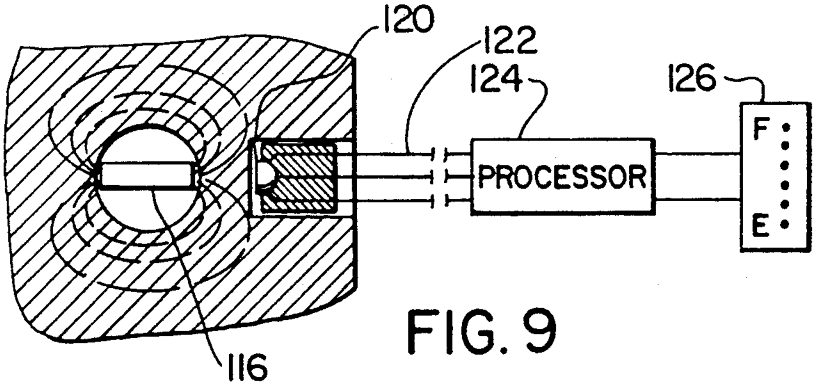
FIG. 9 is a schematic view of an example embodiment of a fuel tank level gauge system in accordance with the present invention.

Turning now to the features of control valve system 2 related to delivery port 22, [s well as the operation of those features, as can be seen in FIG. 4, fuel is delivered from tank 4 to delivery port 22 through delivery tube 74. A plunger 76 having an impermeable seal 78 (e.g. neoprene) is positioned to open and close with respect to valve seat 80 in delivery port 22 (FIG. 8). Plunger 76 is withdrawn from its "valve closed" position illustrated in FIG. 8, against the urging of return spring 82, by means of solenoid 84, to permit passage of fuel through valve seat 80, when solenoid 84 is energized. In a vehicle, this would be when the ignition is turned on and the engine is running.

Figure 6:
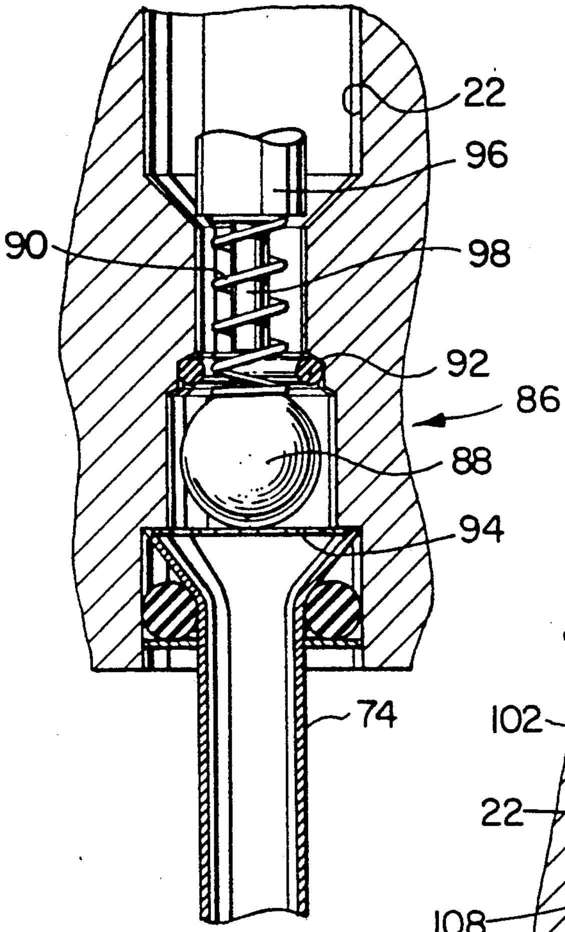
FIG. 6 is an enlarged partial view, in partial section, the excess flow valve in the delivery port, as seen in FIG. 4.
Figure 7A:
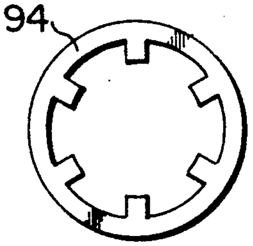
FIG. 7*a* is a plan view of a circular clip used in the excess flow valve of FIG. 7.

When fuel is flowing through delivery port 22, an excess flow valve means 86, illustrated in detail in FIG. 6, is provided. Excess flow valve means 86 comprises a ball 88 (preferably steel) which is acting against one end of a calibrating spring 90. Upstream of the ball in port 22 is mounted an O-ring 92 as illustrated. Upstream of the ball, to be used as a non flow-restricting ball rest, is an appropriate circular clip 94 (FIG. 7*a*), for example positioned in the end of delivery tube 74. The other end of calibrating spring 90 bears against a shut-off stem 96 which is preferably secured to the lower end of manual shut-off valve 28 for delivery port 22. Stem 96 is normally left in the open position since plunger 76 will close the port when the engine is turned off. Thus, under normal conditions, shut-off stem 96 is a redundant feature. It is mainly intended for closing the delivery port 22 before releasing the excess flow valve, so as to create a safe condition should a major leak have developed in the delivery line.

In operation, flow pressure of the fuel passing through delivery port 22 presses ball 88 against a calibrating spring 90 in the form of a compressible coil spring. As the flow exceeds a pre-set value (determined by the strength of the calibrating spring), ball 88 is pressed against O-ring 92, thereby cutting off delivery of fuel. The ball will remain seated on O-ring 92 due to pressure in tank 4. To reset excess flow valve 86, ball 88 must be disengaged from O-ring 92. This is accomplished by closing manual shut-off valve means 28, causing stem 96 and release pin 98 associated therewith, to force ball 88 off of its O-ring seat.

Figure 7:
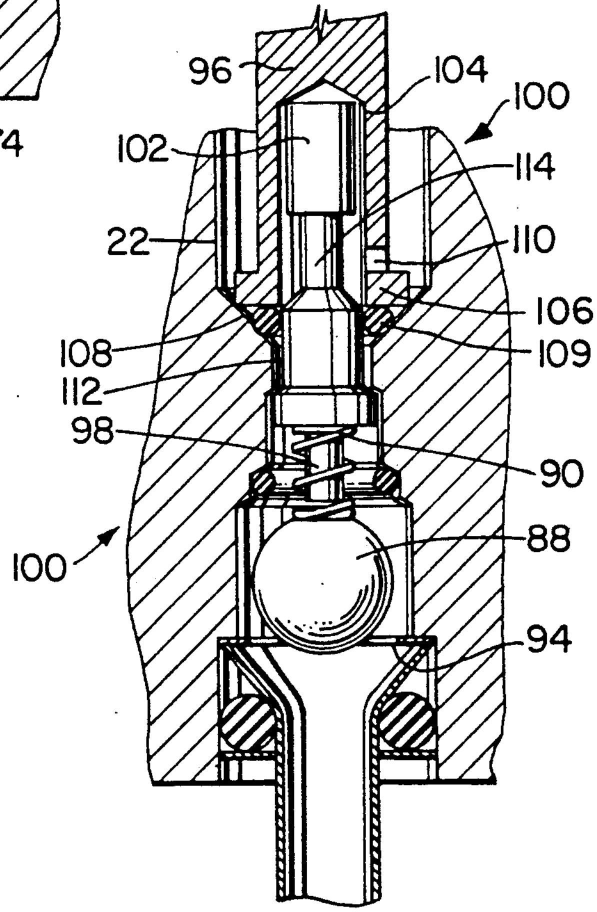
FIG. 7 is a partial view, in partial section, of an alternative embodiment of excess flow valve for the delivery port, which alternative embodiment provides automatic internal pressure relief to the delivery line.

In an optional, but preferred improvement to this excess flow valve 86, an internal relief mechanism 100, as illustrated in FIG. 7, may be additionally provided. In particular, pin 98 is mounted on end of a shuttle 102 which moves within a channel 104 in stem 96. The lower end 106 of stem 96 sealingly engages with valve seat 108, which includes O-ring 109, when stem 96 is lowered to its position as illustrated in FIG. 7, thereby to prevent the flow of fuel through delivery port 22. An aperture 110 however is provided in stem 96, to provide fluid communication from outside stem 96 to channel 104, and the lower end 112 of shuttle 102 is contoured so as to provide a path for return of fuel downwardly from delivery port 22 back to tank 4 if shuttle 102 is lowered so that its narrow, central portion 114 is clear of valve seat 108. Shuttle 102 is normally held in full recessed position inside shut-off stem 96 by means of calibrating spring 90 (ball 88 resting on clip 94). In operation, normally shuttle 102 is fully recessed inside channel 104 of shut-off stem 96, and the shut-off is fully sealed. As pressure builds inside delivery line 24 (which communicates with delivery port 22), the shuttle is moved against the pressure of calibrating spring 90 until it disengages from inside O-ring 109, thereby creating a relief passage allowing excess pressure to safely escape into tank 4.

A bar magnet 116 is secured to the top of spool 46, the magnet being oriented with its longitudinal axis in a direction normal to the axis of rotation of the spool. This bar magnet is a simple indicator at the control valve system itself, of the fuel level in the tank, as indicated by fill indicator 118 in FIG. 2.

The control valve system according to the present invention is also provided with an electronic visual indicator gauge for the level of fuel in tank 4. Mounted in frame 6, adjacent magnet 116, is a Hall Effect sensor 120 (e.g. Texas Instruments TL173C [trade mark]) or any other similar device, which sensor picks up the variation in magnetic field as the orientation of bar magnet 116 changes with the rotative orientation of spool 46. Appropriate circuitry 122 connects the Hall Effect sensor to an electronic processor 124, which conVerts the signals from the sensor to electronic signals which operate a display gauge 126 preferably the vehicle's built-in fuel gauge, to indicate the liquid level in the tank.

Other features, adding to the versatility of the control valve system according to the present invention, include an optional manually operable bleeder valve 130 (FIG. 2) and a conventional pressure relief valve 132 (FIG. 2).

It will be readily understood that the present invention provides, in a single unit, these many control and safety features.

Thus it is apparent that there has been provided in accordance with the invention a multi-functional control valve system for an LPG tank that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A multi-functional control valve system for an LPG tank, the valve system comprising:

(a) a frame having an upper and lower surface and a flange about the lower surface for fastening the frame over an opening in the tank;

(b) a fill port in the frame to deliver LPG from a supply source to the tank, the fill port extending through the frame from the upper surface to the lower surface;

(c) a manual shut-off valve means associated with the fill port to close off the fill port and prevent passage of LPG through this port;

(d) a delivery port in the frame, physically spaced from and independent of the fill port, for passage of LPG from the tank to a delivery line for utilization at a location remote from the tank;

(e) a manual shut-off valve means associated with the delivery port to close off the delivery port and prevent passage of LPG through this port;

(f) fuel level monitor means associated with the frame responsive to the level of LPG in the tank when the frame is mounted on the tank;

(g) automatic shut-off valve means operatively associated with the fuel level monitor means and positioned in the fill port automatically to move to a closed position to close the fill port and stop delivery of LPG to the tank when the fuel in the tank reaches a predetermined level, and automatically releasable from said closed position when delivery of LPG to the fill port is stopped.

2. A valve system according to claim 1 further comprising:

(h) a solenoid operated automatic shut-off valve means positioned in the delivery port to automatically close the delivery port when utilization of LPG at the remote location is not required.

3. A valve system according to claim 2 further comprising:

(i) an excess flow valve means positioned in the delivery port and calibrated to move to a closed position to close off the flow of LPG through the delivery port when a predetermined value of flow rate is exceeded.

4. A valve system according to claim 3 further comprising:

(j) a manually operable means mechanically associated with the excess flow valve means to move the excess flow valve means, when closed, away from closed position and permit safe resumption of flow of LPG through the delivery port.

5. A valve system according to claim 4 wherein the excess flow valve means comprises a ball mounted on one end of a compressible coil spring and positioned within the delivery port, the ball moving against the spring bias to become seated in an O-ring mounted within the delivery port so as to seal off the flow of LPG when the flow rate exceeds a value as determined by the tension of the spring, and wherein the manually operable means associated with the excess flow valve means comprises a stem positioned within the delivery port downstream of the ball, in the direction of normal flow of LPG, on which stem the other end of the spring is mounted, the longitudinal positioning of the stem within the delivery port being manually adjustable so as to abut against and move the ball away from its seated position in the O-ring.

6. A valve system according to claim 5 wherein the manual shut-off valve means associated with the delivery port comprises a manually movable valve movable within the delivery port into releasable sealing engagement with a co-operating valve seat mounted within the delivery port, and wherein the stem is secured to and extends from an end of said valve beyond the valve seat towards the ball.

7. A valve system according to claim 6 wherein a pressure relief means is associated with the stem to relieve excess pressure in the delivery line back to the tank when the delivery port manual shut-off means is closed.

8. A valve system according to claim 7 wherein the pressure relief means comprises a shuttle valve movable, under urging of pressure in the delivery line as a result of a pressure build-up beyond a predetermined degree in the delivery line, into pressure release position in a passage in the end of the delivery port manual shut-off valve means, the passage communicating with the delivery port downstream of the manual shut-off valve means valve, in the direction of normal flow of LPG, the shuttle valve, when in pressure release position, forming a path from the passage through the valve seat to permit release of the pressure from the delivery line to the tank.

9. A valve system according to claim 3 further comprising a pressure relief valve associated with the frame so as to enable automatic pressure relieve in the tank when the frame is in operative position with respect to the tank.

10. A valve system according to claim 3 further comprising a manually operable pressure bleeder means associated with the frame to permit manual bleeding of gas from the tank when the frame is in operative position with respect to the tank, and to detect the level of LPG in the tank.

11. A valve system according to claim 5 wherein the automatic shut-off valve means associated with the fuel level monitor means comprises a filler valve seat positioned in the fill port, the filler valve mounted for movement within the fill port between open position and closed position in sealing engagement with the valve seat, and means cooperating with the valve and the fuel level monitor means to move the valve to closed position when the fuel level monitor means indicates a predetermined level of fuel in the tank.

12. A valve system according to claim 11 wherein said fuel level monitor comprises a spool rotatably secured to the frame and extending below its lower surface, a float means associated with said spool to float on LPG in the tank, the float to cause rotation of the spool about an axis, the amount of rotation being proportional to the level of liquid in the tank, a shoulder extending outwardly from and circumscribing the spool, and a gap in the shoulder at a predetermined location corresponding to a desired level to which the tank is to be filled, and wherein said means cooperating with said valve and said fuel level monitor means comprises a pin extending between the filler valve and the fuel level monitor means, biasing means urging the pin and filer valve into open position, the pin, biasing means, shoulder and gap arranged so that the pin will be forced, by the pressure of LPG flowing in the fill port, to rest on the shoulder to maintain the filler valve in open position during the filling operation, and then to extend down into the gap to enable the filler valve to move into closed position on the seat when the gap in the shoulder becomes aligned with the pin when the spool is rotated to a degree indicating the that the tank is filled to the desired level.

13. A valve system according to claim 6 wherein the manual shut-off valve means associated with the delivery port comprises a narrow stem nose spaced from a wider stem flange with a groove between the stem nose and the stem flange, an O-ring seated int he groove, the stem nose to enter the delivery port upstream from the delivery port valve seat in a snug fitting slide fit as this valve means is being closed to reduce the flow of LPG before the O-ring and stem flange sealingly engage the valve seat when this valve means for the delivery port is fully closed.

14. A valve system according to claim 1 wherein the automatic shut-off valve means associated with the fuel level monitor means comprises a filler valve seat positioned in the fill port, the filler valve mounted for movement within the fill port between open position and closed position in sealing engagement with the valve seat, and means cooperating with the valve and the fuel level monitor means to move the valve to closed position when the fuel level monitor means indicates a predetermined level of fuel in the tank.

15. A valve system according to claim 14 wherein said fuel level monitor means comprise a spool rotatably secured to the frame and extending below its lower surface, a float means associated with said spool to float on LPG in the tank, the float to cause rotation of the spool about an axis, the amount of rotation being proportional to the level of liquid in the tank, a shoulder extending outwardly from and circumscribing the spool, and a gap in the shoulder at a predetermined location corresponding to a desired level to which the tank is to be filled, and wherein said means cooperating with said valve and said fuel level monitor means comprises a pin extending between the filler valve and the fuel level monitor means, biasing means urging the in and filler valve into open position, the pin, biasing means, shoulder and gap arranged so that the pin will be forced, by the pressure of LPG flowing in the fill port, to rest on the shoulder to maintain the filler valve in open position during the filling operation, and then to extend down into the gap to enable the filler valve to move into closed position on the seat when the gap in the shoulder becomes aligned with the pin when the spool is rotated to a degree indicating the that the tank is filled to the desired level.

16. A valve system according to claim 15 wherein the fill port is further provided with a check valve seat spaced from the filler valve seat upstream thereof, the filler valve and biasing means arranged so that, when the pressure of the LPG being delivered to the tank is removed from the filler valve, the biasing means urges the filler valve into closed position in sealing engagement on the check valve seat.

17. A valve system according to claim 16 wherein the biasing means comprises a spring.

18. A valve system according to claim 15 wherein the biasing means comprises a spring.

19. A valve system according to claim 15 wherein a bar magnet is secured to the spool to move therewith, and a Hall Effect sensor means is positioned in the frame near the magnet to convert magnetic field variations, resulting from progressive reorientation of the magnet as the spool rotates, into electronic signals corresponding thereto, electronic circuitry, processor means and gauge means associated with the Hall Effect sensor means whereby said electronic signals are converted into visible readings on the gauge means.

20. A valve system according to claim 1 further comprising a pressure relief valve associated with the frame so as to enable automatic pressure relieve in the tank when the frame is in operative position with respect to the tank.

21. A valve system according to claim 1 further comprising a manually operable pressure bleeder means associated with the frame to permit manual bleeding of gas from the tank when the frame is in operative position with respect to the tank, and to detect the level of LPG in the tank.

22. A valve system according to claim 1 wherein the manual shut-off valve means associated with the fill port comprises a narrow stem nose spaced from a wider stem flange with a groove between the stem nose and the stem flange, an O-ring seated in the groove, the stem nose to enter the fill port upstream from a shut-off valve seat in the direction of normal flow of LPG in a snug fitting slide fit as this valve means is being closed, to reduce the flow of LPG before the O-ring and stem flange sealingly engage the shut-off valve seat, when this valve means is fully closed.

23. A valve system according to claim 1 wherein said manual shut-off valve means associated with the fill port comprises a filler shut-off valve seat within the fill port and a valve manually movable within the fill port into sealing engagement with the filler shut-off valve seat.

24. A valve system according to claim 1 wherein the manual shut-off valve means associated with the delivery port comprises a narrow stem nose spaced from a wider stem flange with a groove between the stem nose and the stem flange, an O-ring seated in the groove, the stem nose to enter the delivery port downstream from a shut-off valve seat in the direction of normal flow of LPG in a snug fitting slide fit as this valve means is being closed to reduce the flow of LPG before the O-ring and steam flange sealingly engage the shut-off valve seat when this valve means is fully closed.

* * * * *